United States Patent [19]

Okamura

[11] Patent Number: 4,679,440

[45] Date of Patent: Jul. 14, 1987

[54] THROTTLE SENSOR FOR ENGINE

[75] Inventor: Masayuki Okamura, Aichi, Japan

[73] Assignee: Aisan Kogyo Kabushiki Kaisha, Ichi, Japan

[21] Appl. No.: 683,188

[22] Filed: Dec. 18, 1984

[30] Foreign Application Priority Data

Jan. 20, 1984 [JP] Japan .................................. 59-9202

[51] Int. Cl.$^4$ .......................................... G01M 15/00
[52] U.S. Cl. ................................................ 73/118.1
[58] Field of Search ........................... 324/63; 73/118; 123/494; 338/121

[56] References Cited

U.S. PATENT DOCUMENTS

1,931,223 10/1933 Harrison ................................ 324/63
4,391,250 7/1983 Matsui ............................ 123/494 X Primary Examiner—Jerry W. Myracle

[57] ABSTRACT

A throttle sensor for an engine comprises a first variable resistor interlocked with an opening and closing operation of a throttle valve of the engine and adapted to output an electrical signal corresponding to an opening degree of the throttle valve, and a composite circuit variable resistor electrically connected to the first variable resistor and adapted to correct a correlative value between the opening degree of the throttle valve and the electrical signal to be outputted from the first variable resistor corresponding to the opening degree. Thus, the correlative value of the electrical signal to be outputted from the variable resistor to the opening degree of the throttle valve may be easily and accurately adjusted to a target value.

1 Claim, 10 Drawing Figures

THROTTLE SENSOR FOR ENGINE

BACKGROUND OF THE INVENTION

This invention relates to a throttle sensor for sensing opening degree of a throttle valve of an engine and outputting an electric signal corresponding to the opening degree.

Conventionally, two methods are available for opening and closing a throttle valve of an engine. One of the methods is a mechanical method wherein the throttle valve is opened and closed by transmitting depression operation of an acceleration pedal to a throttle cable and rotating a throttle lever through the throttle cable. The other is an electrical method wherein the throttle valve is opened and closed by converting an amount of depression of the acceleration pedal to an electrical signal and opening and closing the throttle valve by a motor actuatable in response to the electrical signal as converted. In both the above-mentioned methods, a throttle shaft mounting the throttle valve is connected to a variable resistor so that the throttle shaft may be interlocked with the opening and closing operations of the throttle valve, and a throttle sensor is used for outputting an electrical signal corresponding to the opening and closing operations of the throttle valve and for sensing opening degree of the throttle valve.

Figure 1:
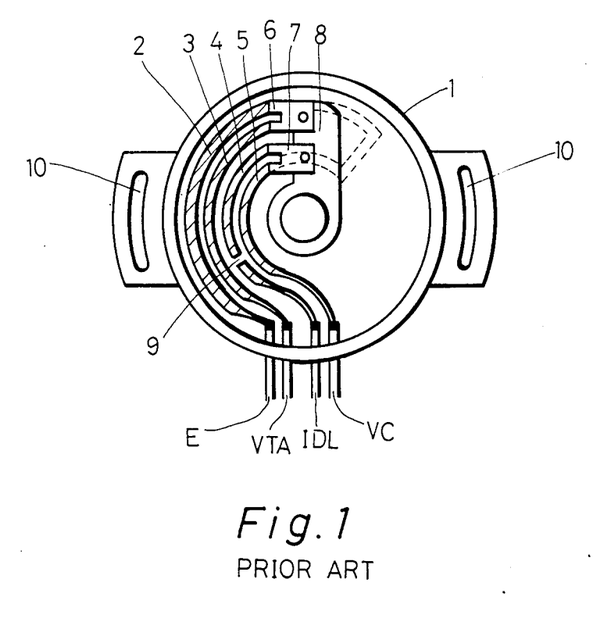
FIG. 1 is an elevational view of a conventional throttle sensor.
Figure 4:
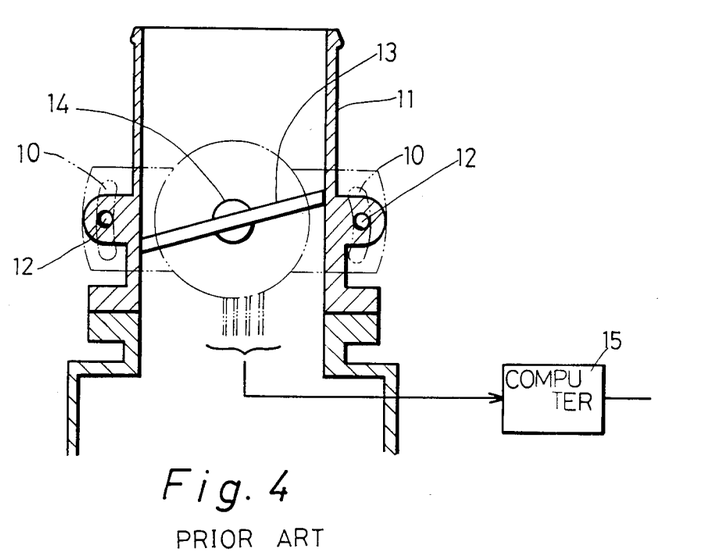
FIG. 4 is a schematic view showing the mounting of the prior art throttle sensor.

As shown in FIG. 1, a conventional throttle sensor 1 includes resistors 2, 3, 4 and 5, a slide member or wiper 6 slidably contacting with the resistors 2 and 3, a slide member or wiper 7 slidably contacting with the resistors 4 and 5, and a slide portion 8 mounting both the slide members 6 and 7. The slide portion 8 is so arranged as to be interlocked with rotation of a throttle shaft 14 mounting a throttle valve 13 as shown in FIG. 4, and the slide member 6 serves to change resistance between both the resistors 2 and 3 in dependence upon opening and closing operations of the throttle valve 13, while the slide member 7 serving to change resistance between both the resistors 4 and 5. In the case that +5 V of DC 5 V constant voltage power supply is applied to a terminal Vc of the resistor 5, and 0 V of the DC 5 V constant voltage power supply is applied to a terminal E of the resistor 2, a voltage outputted from a terminal VTA of the resistor 3 is linearly changed in proportion to rotation of the slide portion 8, and as the throttle valve 13 is driven in its closing direction, the voltage outputted from the terminal VTA of the resistor 3 is reduced. Further, the resistor 4 has a cut portion 9, and under almost closed condition of the throttle valve 13, that is under idling condition, a voltage outputted from a terminal IDL of the resistor 4 becomes +5 V.

Figure 2:
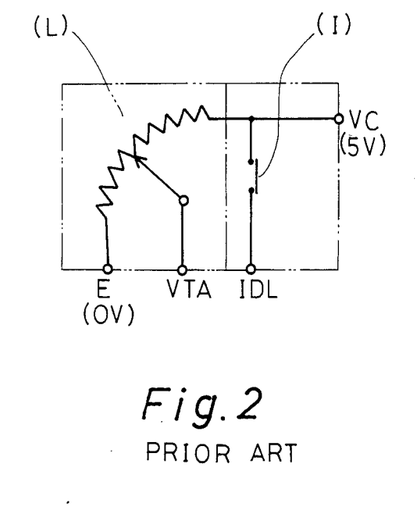
FIG. 2 is an electrical circuit diagram of FIG. 1.
Figure 3:
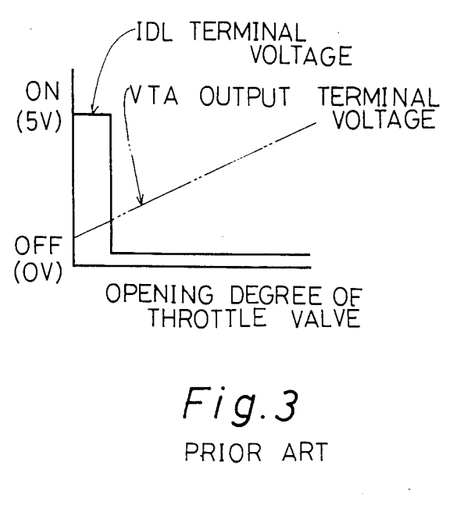
FIG. 3 is a characteristic graph of FIG. 2.

Accordingly, a set of variable resistors composed of the resistors 2 and 3 and the slide member 6 serves as a throttle sensor L for outputting an electrical signal corresponding to opening degree of the throttle valve 13 from the terminal VTA, while another set of variable resistors composed of the resistors 4 and 5 and the slide member 7 serves as an idling switch I for outputting an electrical signal of +5 V from the terminal IDL under idling condition and outputting an electrical signal of 0 V when the throttle valve is driven in its opening direction. FIG. 2 shows an electrical circuit diagram of the throttle sensor 1 having the above-mentioned function, and FIG. 3 shows a characteristic graph of FIG. 2.

As shown if FIG. 4, the throttle sensor 1 is fixed at its elongated hole 10 to a throttle body 11 at its screw hole 12 by a screw and the like. A throttle shaft 14 mounting a throttle valve 13 is connected to the slide portion 8 of the throttle sensor 1, and when position of the slide portion 8 of the throttle sensor 1 relative to opening degree of the throttle valve 13 is determined, slight adjustment of positioning of the slide portion 8 is permitted with the aid of the elongated hole 10 of the throttle sensor 1. Such a relative position of the slide portion 8 to the opening degree of the throttle valve 13 is important for determining an amount of fuel to be injected by command of a computer 15 to which an electrical signal outputted from the terminal VTA of the throttle sensor 1 is inputted, and also for determining whether the engine is under idling control or acceleration and deceleration control when an electrical signal outputted from the terminal IDL of the idle switch I is inputted to the computer 15. In the event that the position of the throttle valve 13, that is, the position of the slide portion 8 under almost closed condition of the throttle valve 13 or idling condition, is not accurately set, the voltage to be outputted from the terminal IDL will become 0 V, but not +5 V, and as a result, the acceleration and deceleration control for fuel injection control is decided by the computer 15, thereby deteriorating driving feeling of a vehicle.

Further, when the throttle sensor 1 and the throttle body 11 are initially set, respective voltages to be outputted from the terminals VTA and IDL of the throttle sensor 1 are measured by using a digital voltmeter and the like with an accuracy of a milivolt unit. To this end, relative position of the throttle sensor 1 to the throttle body 11 must be mechanically adjusted in the range of the elongated hole 10 of the throttle sensor 1, which requires a large number of awkward acts. Further, in the event that the screws fixed to the throttle sensor 1 and the throttle body 11 are loosened because of vibrations during the vehicle operation after initial setting to create deviation of the relative position of the slide portion 8 of the throttle sensor 1 with respect to the opening degree of the throttle valve 13 owing to a free space of the elongated hole 10, the relative position of the throttle sensor 1 to the throttle body 11 must by adjusted again in the same way as the initial setting, which is also awkward requiring a large number of steps.

SUMMARY OF THE INVENTION

Accordingly, it is an object of the present invention to provide a throttle sensor comprising a variable resistor outputting an electrical signal corresponding to opening degree of the throttle valve in association with opening and closing operations of the throttle valve of the engine and a composite circuit variable resistor electrically connected to the variable resistor, whereby a correlative value of the electrical signal to be outputted from the variable resistor to the opening degree of the throttle valve may be easily and accurately adjusted to a target valve.

Figure 5:
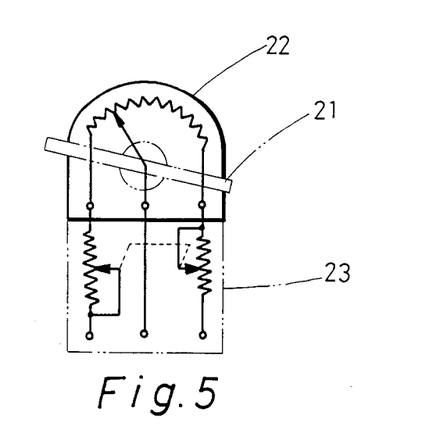
FIG. 5 is a view showing the arrangement of the present invention.

As shown in FIG. 5, the throttle sensor of the engine according to the present invention comprises a variable resistor 22 for outputting an electrical signal corresponding to the degree of opening of the throttle valve 21 in association with opening and closing operations of the throttle valve 21 of the engine and a composite circuit variable resistor 23 electrically connected to the variable resistor 22 and adapted to correct a correlative value between the opening degree of the throttle valve 21 and the electrical signal outputted from the variable resistor 22 corresponding to the opening degree of the throttle valve 21.

Above and other objects, features and advantages of the present invention will become readily apparent from considering the following detailed description in conjunction with the accompanying drawings.

DETAILED DESCRIPTION OF THE PREFERRED EMBODIMENT

Figure 6:
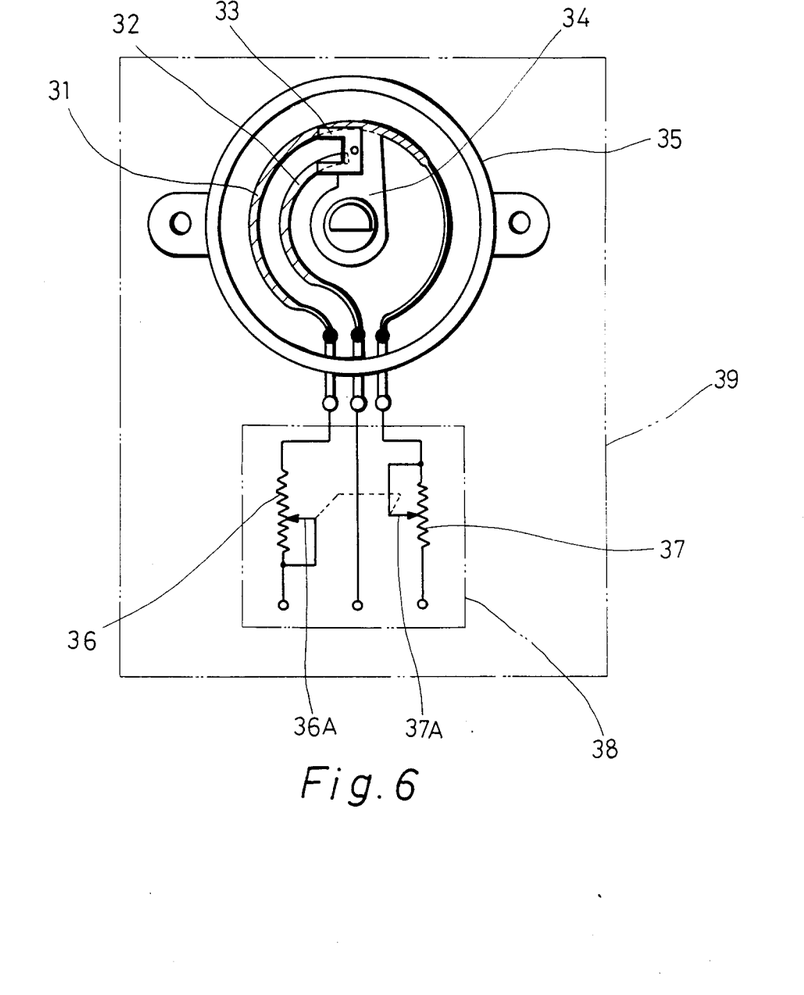
FIG. 6 is a schematic view showing the connection of the throttle sensor of a preferred embodiment according to the present invention.

Referring to FIG. 6, a throttle sensor 39 comprises a variable resistor 35 and a composite circuit variable resistor 38 which are electrically connected with each other. The variable resistor 35 comprises resistors 31 and 32, a slide member 33 electrically contacted with surfaces of the resistors 31 and 32, and a slide portion 34 adapted to be rotated in interlocking relationship with rotation of the throttle shaft fixing the throttle valve of the engine. The composite circuit variable resistor 38 comprises two variable resistors 36 and 37 having slide members 36A and 37A, respectively, which are interlocked with each other to change resistance.

Figure 7:
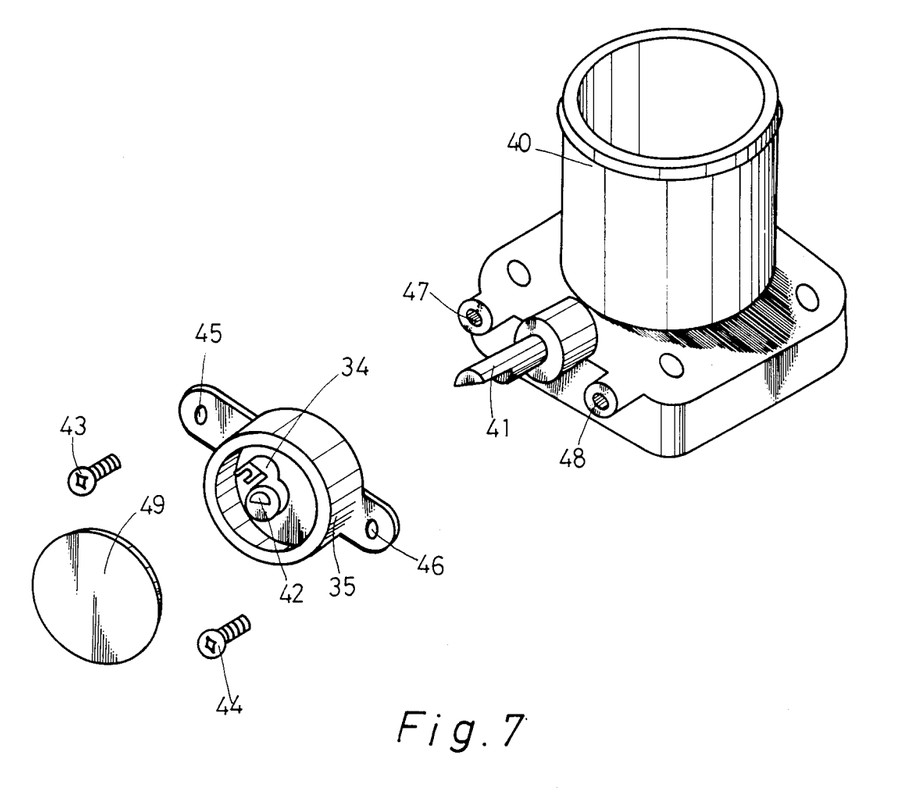
FIG. 7 is an exploded perspective view of the new throttle sensor and the throttle body.

Referring to FIG. 7 which shows a manner of installation of the variable resistor 35 to a throttle body 40, a throttle shaft 41 of the throttle body 40 is inserted into an insert hole 42 formed in the slide portion 34 of the variable resistor 35, and then the variable resistor 35 is connected by screws 43 and 44 through openings 45 and 46 of the variable resistor 35 and screw holes 47 and 48 of the throttle body 40 to the throttle body 40. Thereafter, electrical adjustment is made, and then a cover 49 is set in place.

Figure 8:
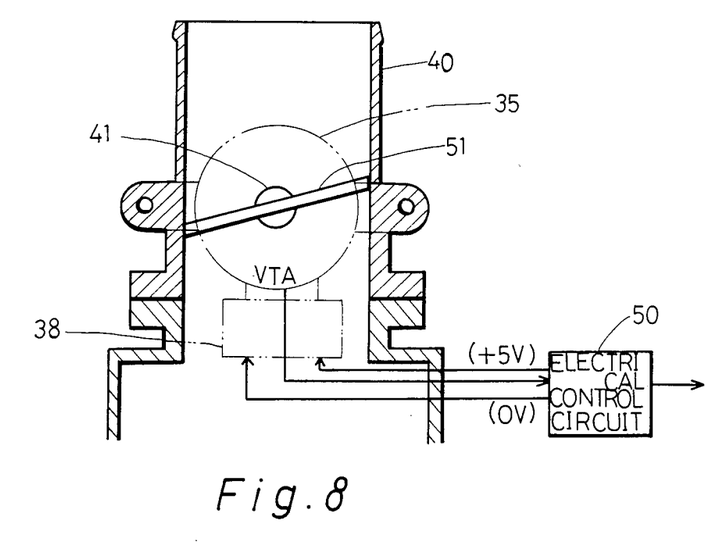
FIG. 8 is a schematic view of the mounting of the throttle sensor.

Referring to FIG. 8 which shows an assembly of the variable resistor 35 to the throttle body 40, the variable resistor 35 is electrically connected to the composite circuit variable resistor 38, and a d.c. regulated voltage, e.g. 5 V is supplied from an electrical control circuit 50 to the composite circuit variable resistor 38. Then, an electrical signal corresponding to an opening degree of a throttle valve 51 is outputted from the output terminal VTA of the variable resistor 35 to the electrical control circuit 50.

Figures 9, 10:
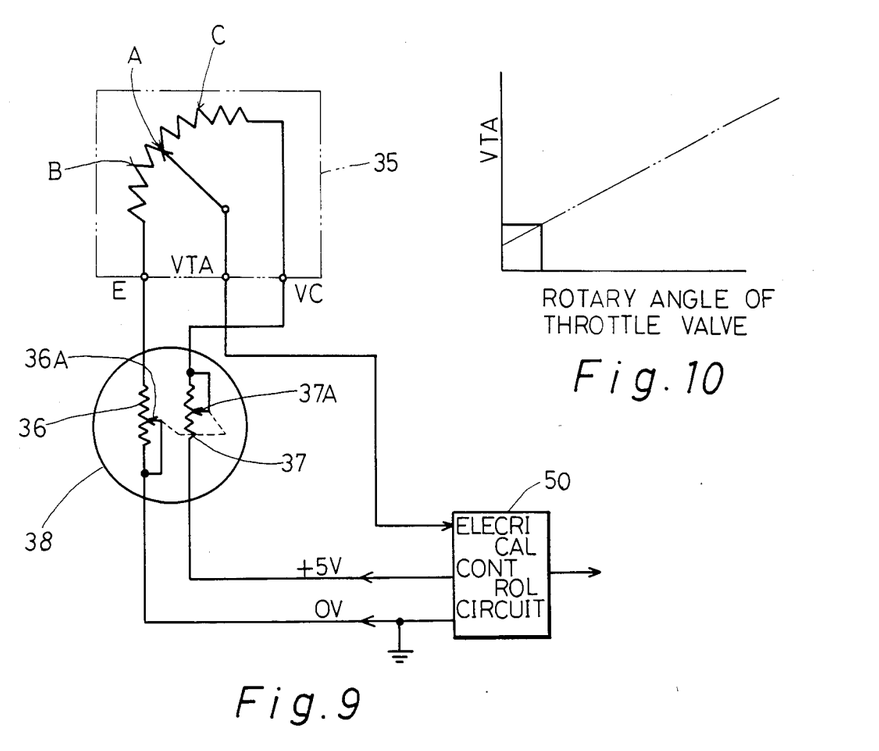
FIG. 9 is an electrical circuit diagram of FIG. 8.
FIG. 10 is a characteristic graph of FIG. 9.

In operation, FIG. 9 is an electrical circuit diagram of FIG. 8, wherein the variable resistor 35 is connected to the throttle body 40, and is electrically connected to the composite circuit variable resistor 38, thereafter applying constant voltage of 5 V from the electrical control circuit 50 to the composite circuit variable resistor 38.

As variations in dimensional tolerance and resistance are apt to be generated during manufacturing of the variable resistor 35, relative position between the resistors 31 and 32 and the slide member 33 is offset. Further, variation in relative position between the variable resistor 35 and the throttle body 40 is apt to be generated. As shown in FIG. 9, when a target position of the output terminal VTA of the variable resistor 35 is set at a point A, and an actual set position is set at a point B owing to the above-mentioned difference in accuracy, the slide members 36A and 37A are adjusted in position in interlocking relationship with each other in such a manner that resistance of the composite variable resistor 38 on the variable resistor 36 side is increased, while resistance on the variable resistor 37 side is decreased, so that voltage to be outputted from the output terminal VTA of the variable resistor 35 may be set to a target value. When the set position of the output terminal VTA of the variable resistor 35 is set at a point C for the same reason as above, the slide members 36A and 37A are adjusted in position in interlocking relationship with each other in such a manner that the resistance of the composite circuit variable resistor 38 on the variable resistor 36 side is decreased, while the resistance on the variable resistor 37 side is increased, so that the voltage to be outputted from the output terminal VTA of the variable resistor 35 may be set to the target value.

Accordingly, even when there is created difference in target relative position between a position of the slide member 33 of the variable resistor 35 and a rotary angle of the throttle shaft 41 of the throttle body 40 because of tolerance in manufacturing of the variable resistor 35 and variation during installation thereof, it is possible to easily set the target value by adjusting the resistance of the composite circuit variable resistor 38 without changing the characteristic gradient of linear output signal from the output terminal VTA of the variable resistor 35 as shown in FIG. 10. In other words, according to the present invention, adjustment to the target value may be easily carried out as compared with a conventional method wherein mount holes of the variable resistor are formed into elongated holes, and the variable resistor is rotated in the range of dimension of the elongated holes to set the output voltage from the variable resistor to the target value. Therefore, the number of adjusting steps may be significantly reduced.

Further, although the composite circuit variable resistor 38 is arranged outside of the variable resistor 35, it may be arranged inside of the variable resistor 35, thereby providing similar effects.

Numerous modifications and variations of the disclosed invention will become apparent to those skilled in the art without departing from the scope and spirit of the invention as defined in the attached claims.

What is claimed is:

1. A throttle sensor for an engine comprising a first variable resistor having an operating element fixed with a movable portion of a throttle valve of the engine and adapted to output an electrical signal having a magnitude corresponding to the degree of opening of the throttle valve, and means to automatically adjust the correlative value of said electrical signal to the opening degree of the throttle valve, said means comprising a composite circuit variable resistor means connected electrically to said first variable resistor and adapted to correct a correlative value between the opening degree of the throttle valve and the magnitude of the electrical signal output from said first variable resistance, said composite circuit variable resistor means including a second and third variable resistor, said second and third resistors each having slide adjustment means interlocked with each other, an output terminal on said first variable resistor, and said slide adjustment means being separately adjustable with respect to each other, so as to set an output voltage from said output terminal to a target value of an output voltage corresponding to the opening degree of said throttle valve.

* * * * *